(12) United States Patent
Chou

(10) Patent No.: US 8,845,322 B2
(45) Date of Patent: Sep. 30, 2014

(54) MOLD ASSEMBLY FOR MAKING LIGHT GUIDE PLATES

(75) Inventor: Yun-Yu Chou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 39 days.

(21) Appl. No.: 13/596,031

(22) Filed: Aug. 27, 2012

(65) Prior Publication Data

US 2013/0273194 A1    Oct. 17, 2013

(30) Foreign Application Priority Data

Apr. 12, 2012  (TW) .................................. 101112902

(51) Int. Cl.
*B29C 45/40* (2006.01)

(52) U.S. Cl.
USPC ........ 425/556; 264/334; 264/328.7; 425/412; 425/577

(58) Field of Classification Search
USPC ............... 425/556, 577, 412; 264/334, 328.7
See application file for complete search history.

(56) References Cited

U.S. PATENT DOCUMENTS 3,572,424 A * 3/1971 Byrne ........................... 425/556
5,252,280 A * 10/1993 Motisi ........................... 425/556

* cited by examiner

*Primary Examiner* — Tim Heitbrink
(74) *Attorney, Agent, or Firm* — Novak Druce Connolly Bove + Quigg LLP

(57) ABSTRACT

A mold assembly includes a male mold, a female mold, and a driving unit. The male mold includes a stationary member, a moveable member defining through holes, and mold cores fixed on the stationary member and received in the respective through holes. The female mold covers the moveable member. The female mold defines recesses aligned with and communicating with the respective through holes. The moveable member, the female mold and the mold cores cooperatively form mold cavities at the through holes. The driving unit is fixed on the stationary member and supports the moveable member. The driving unit is configured for driving the moveable member to move upward or downward along the mold cores relative to the stationary member.

7 Claims, 5 Drawing Sheets

MOLD ASSEMBLY FOR MAKING LIGHT GUIDE PLATES

BACKGROUND

1. Technical Field

The present disclosure relates to molding technology, and particularly to a mold assembly for making light guide plates.

2. Description of Related Art

Generally, a light guide plate is manufactured by an injection molding process using a mold assembly. A mold cavity is defined in the mold assembly. In the injection molding process, molten molding material is injected into the mold cavity. After the molten molding material has completely solidified, the light guide plate is formed. However, the depth of the mold cavity is unchangeable. Therefore, the thickness of the light guide plate is fixed.

Therefore, it is desirable to provide a mold assembly for making light guide plates, which can overcome or at least alleviate the limitations described.

DETAILED DESCRIPTION

Figure 1:
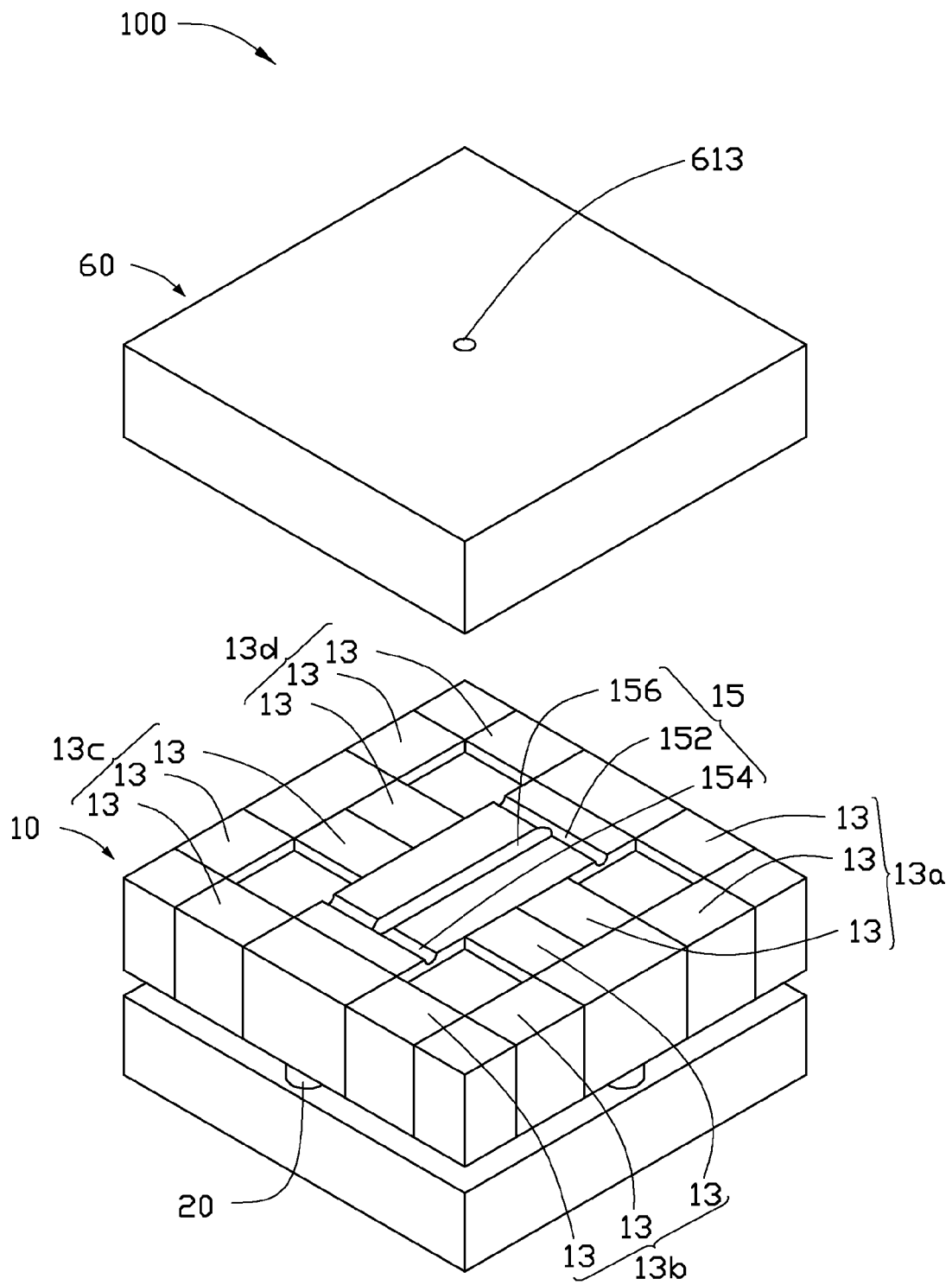
FIG. 1 is a schematic, isometric view of a mold assembly including a male mold and a female mold, according to an exemplary embodiment.

Referring to FIG. 1, a mold assembly 100 for making light guide plates (not shown), according to an exemplary embodiment, is shown. The mold assembly 100 includes a male mold 10, a driving unit 20, and a female mold 60.

Figure 2:
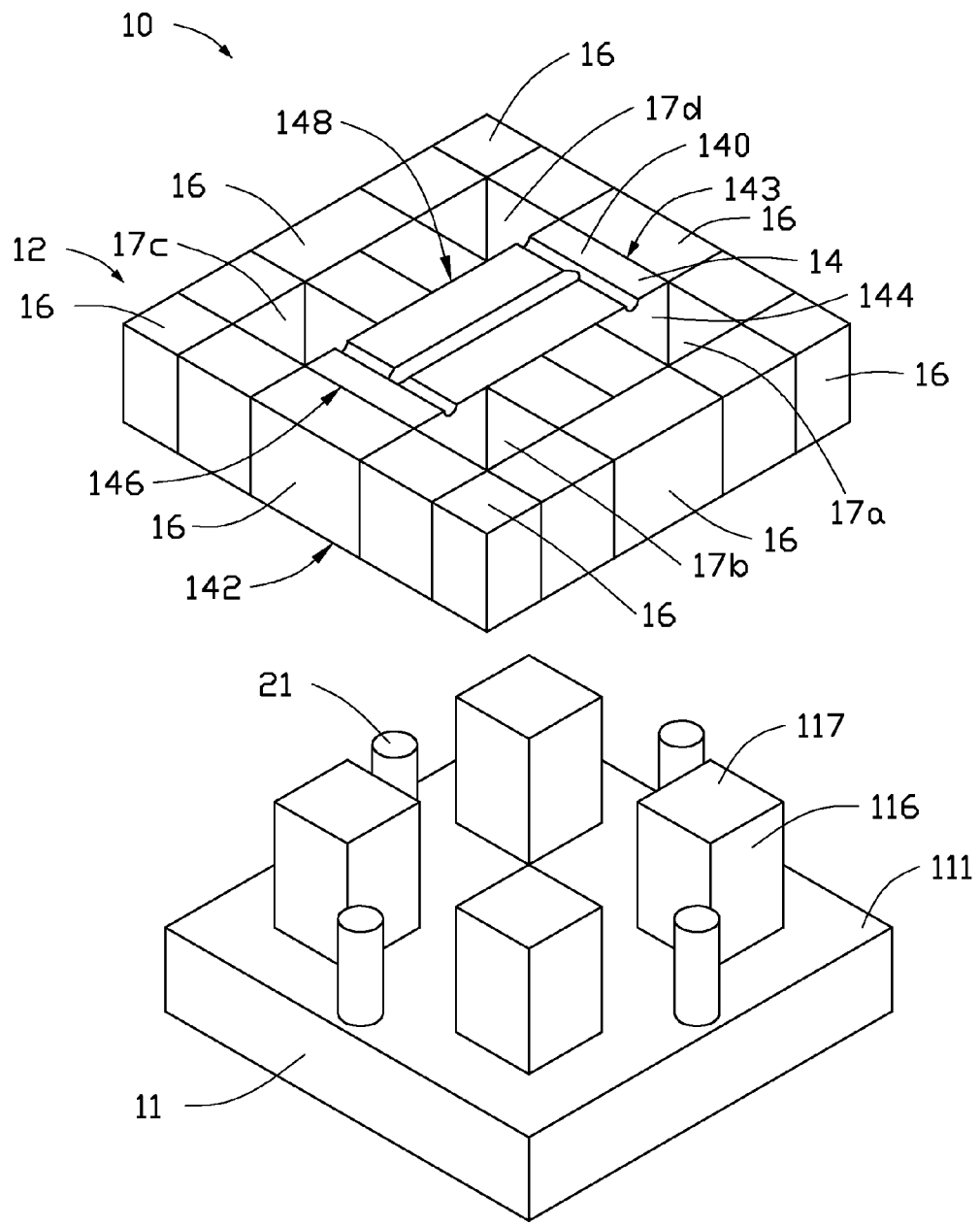
FIG. 2 is an exploded view of the male mold of the mold assembly of FIG. 1.

Referring to FIGS. 1-2, the male mold 10 includes a stationary member 11, four mold cores 116, and a moveable member 12. The stationary member 11 is substantially a rectangular plate and includes a supporting surface 111. Each mold cores 116 is substantially a rectangular pole and perpendicularly extends from the supporting surface 111. The mold cores 116 are uniformly distributed on the supporting surface 111. Each mold core 116 has a molding surface 117 facing away from the supporting surface 111. The shape of the molding surface 117 matches with the shape of the to-be-molded light guide plates.

The moveable member 12 is substantially a rectangular plate and defines a first through hole 17a, a second through hole 17b, a third through hole 17c, and a fourth through hole 17d. The four through holes (17a, 17b, 17c, and 17d) respectively receive the four male cores 116. The shape of the four through holes (17a, 17b, 17c, and 17d) matches with the shape of the male cores 116. The moveable member 12 includes a central block 14, twelve lubrication blocks 13, and eight connection blocks 16.

The central block 14 is positioned at a central portion of the moveable member 12. The central block 14 includes an upper surface 140, a lower surface 142, a first side surface 143, a second side surface 144, a third side surface 146, and a fourth side surface 148. The upper surface 140 is substantially parallel to the lower surface 142. The lower surface 142 faces the supporting surface 111. The upper surface 140 is opposite to the lower surface 142. The first side surface 143 is substantially parallel to the third side surface 146. The second side surface 144 is substantially parallel to the fourth side surface 148. The first side surface 143, the second side surface 144, the third side surface 146, and the fourth side surface 148 are connected end-to-end.

An I-shaped runner 15 is defined in the upper surface 140. In detail, the runner 15 includes a first channel 152, a second channel 154, and a third channel 156. The first channel 152 is substantially parallel to the second channel 154. The first channel 152 is substantially parallel to the first side surface 143 and extends through the second side surface 144 and the fourth side surface 148. Opposite sides of the first channel 152 respectively communicate with the first through hole 17a and the fourth through hole 17d. The second channel 154 is substantially parallel to the first side surface 143 and extends through the second side surface 144 and the fourth side surface 148. Opposite sides of the second channel 154 respectively communicate with the second through hole 17b and the third through hole 17c. The third channel 156 communicates with the first channel 152 and the second channel 154.

The lubrication blocks 13 are equally divided into four groups, such as a first lubrication block group 13a, a second lubrication block group 13b, a third lubrication block group 13c, and a fourth lubrication block group 13d. The first lubrication block group 13a is fixed to the second side surface 144 to bound the first through hole 17a. The second lubrication block group 13b is fixed to the second side surface 144 to bound the second through hole 17b. The third lubrication block group 13c is fixed to the fourth side surface 148 to bound the third through hole 17c. The fourth lubrication block group 13d is fixed to the fourth side surface 148 to bound the fourth through hole 17d.

Figure 3:
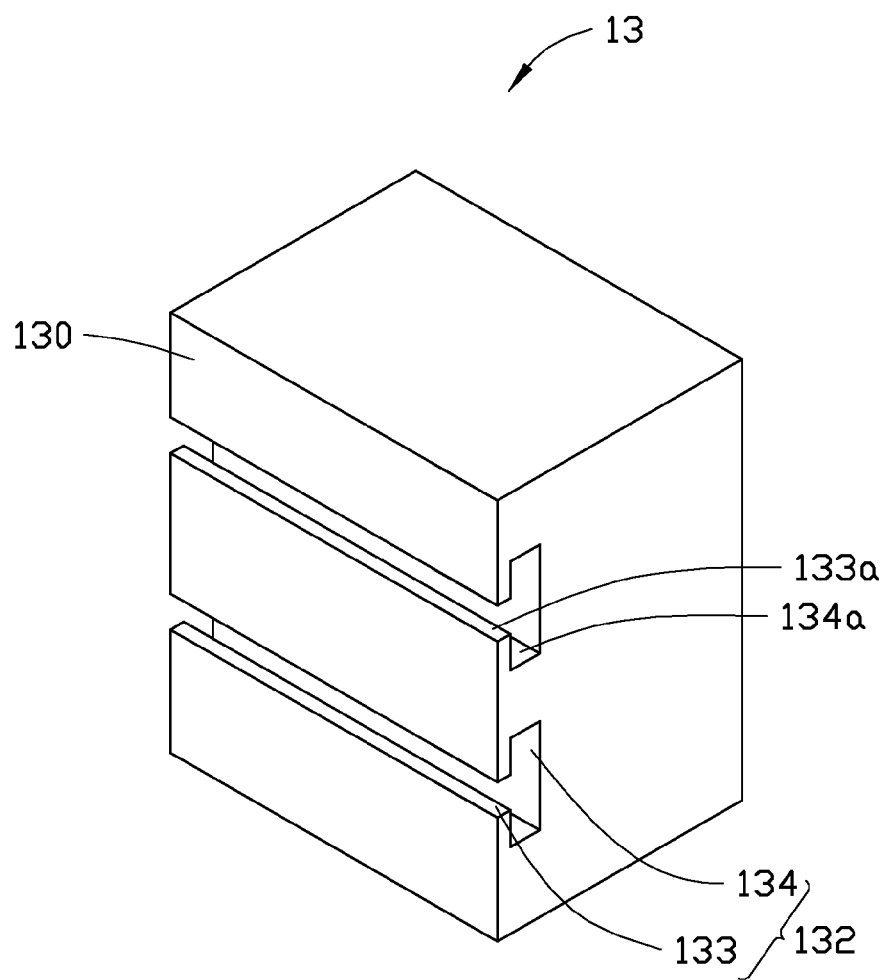
FIG. 3 is a schematic, isometric view of a lubrication block of the male mold of FIG. 2.
Figure 5:
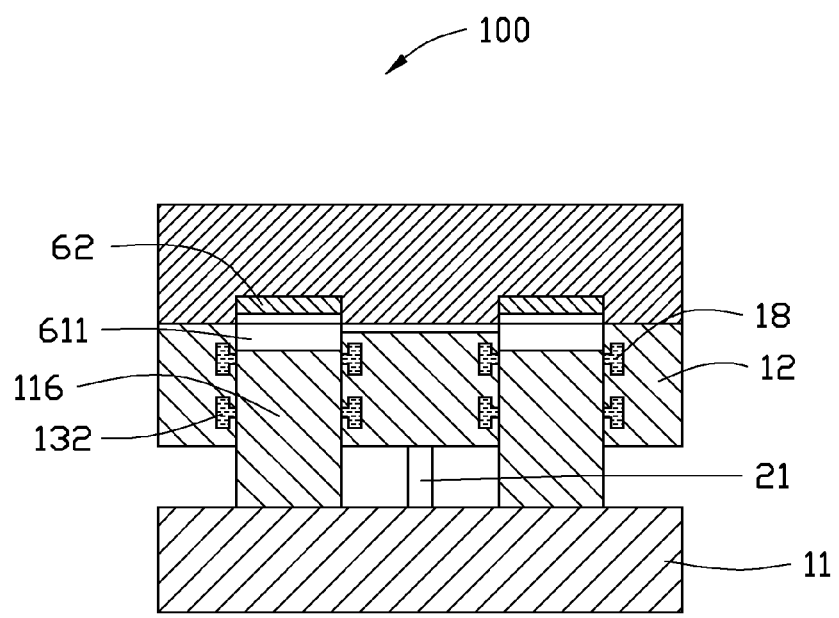
FIG. 5 is a cross-sectional view of the mold assembly of FIG. 1.

Referring to FIGS. 2-3, each lubrication block 13 is substantially a cube and includes a lubrication surface 130 facing the first through hole 17a, or the second through hole 17b, or the third through hole 17c, or the fourth through hole 17d. The lubrication surface 130 defines two slots 132 which are in communication with the respective through holes (17a, 17b, 17c, and 17d) and filled with lubrication oil 18 (shown in FIG. 5). Each slot 132 is T-shaped and includes an outer narrow slot portion 133 and an inner wider slot portion 134. The outer narrow slot portion 133 is in communication with one of the through holes (17a, 17b, 17c, and 17d) and includes two first surfaces 133a facing each other. The inner wider slot portion 134 is in communication with the outer narrow slot portion 133 and includes two second surfaces 134a facing each other. The distance between the two first surfaces 133a is less than the distance between the two second surfaces 134a. That is, the width of the inner wider slot portion 134 is greater than the width of the outer narrow slot portion 133. Lubrication oil 18 can be received in the inner wider slot portion 134 due to its surface tension.

Four of the connection blocks 16 are positioned at the four corners of the moveable member 12. Two of the connection blocks 16 are respectively fixed to the first side surface 143 and the third side surface 146. One of the connection blocks 16 connects the first lubrication block 13a to the second lubrication block 13b. One of the connection blocks 16 connects the third lubrication block 13c to the fourth lubrication block 13d.

The driving unit 20 is configured for driving the moveable member 12 to move upward or downward along the male cores 116. The driving unit 20 includes four hydraulic cylinders 21. The hydraulic cylinders 21 perpendicularly extend from the supporting surface 111 and apart from the four male cores 116. One end of the hydraulic cylinders 21 is fixed to the stationary member 11, and the other end is fixed to the moveable member 12. The height of each of the hydraulic cylinders 21 is lower than the height of each of the mold cores 116.

Figure 4:
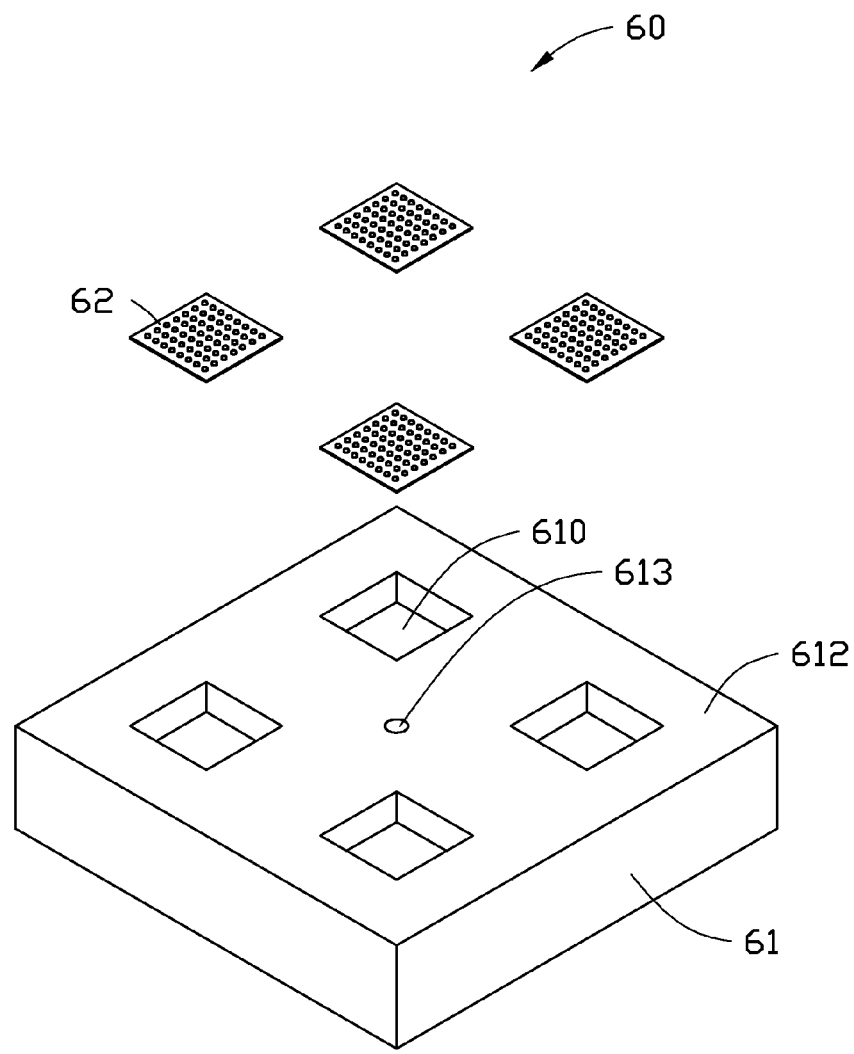
FIG. 4 is a schematic, isometric view of the female mold of the mold assembly of FIG. 1.

Referring to FIGS. 1 and 4, the female mold 60 covers the male mold 10 and includes a body 61 and four plates 62. The body 61 is substantially a rectangular plate and includes a bottom surface 612 facing the male mold 10. Four recesses 610 are defined in the bottom surface 612 corresponding to the four male cores 116. A sprue 613 is defined in a central portion of the body 61. Each plate 62 is received in a corresponding recess 610 and has dot structure thereon for forming dots on a light guide plate. Each plate 62 is configured for forming dots on the light guide plate.

Referring to FIGS. 1-2 and 4-5, in assembly, the moveable member 12 is fixed on the hydraulic cylinders 21, and the male cores 116 are respectively received in the four through holes (17a, 17b, 17c, and 17d). The female mold 60 covers the male mold 10. In detail, the bottom surface 612 is coplanar with the upper surface 140. The sprue 613 is aligned with the third channel 156. The four recesses 610 are respectively aligned with the four through holes (17a, 17b, 17c, and 17d). Therefore, four mold cavities 611 are formed between the plates 62 and the molding surfaces 117 of the male cores 116.

When making the light guide plates, first, a depth of the mold cavities 611 is determined by driving the moveable member 12 to move upward or downward via the hydraulic cylinders 21. Second, molten molding material is introduced into the mold cavities 611 through the sprue 613 and the runner 15. After the molten molding material is full of the mold cavities 611, the molten molding material is cooled, the light guide plates with dots are formed. During the process, the depth of the mold cavities 611 can be changed via the hydraulic cylinders 21 driving the moveable member 12. Therefore, light guide plates with different thickness can be formed. In addition, the lubrication oil 18 received in the slots 132 lubricates the mold cores 116 and the lubrication blocks 13 when the moveable member 12 moves. Therefore, the service life of the mold assembly 100 is prolonged.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A mold assembly for making light guide plates, comprising:
    a male mold comprising a stationary member, a moveable member defining a plurality of through holes, a plurality of mold cores fixed on the stationary member and received in the respective through holes, the moveable member comprising a central block, four lubrication block groups, and a plurality of connection blocks, each lubrication block group consisting of three lubrication blocks, the lubrication blocks of each lubrication group and the central block cooperatively defining a through hole, and each connection block positioned between two neighboring lubrication blocks;
    a female mold covering the moveable member, the female mold defining a plurality of recesses aligned with and communicating with the respective through holes, the moveable member, the female mold and the mold cores cooperatively forming a plurality of mold cavities at the through holes; and
    a driving unit fixed on the stationary member and supporting the moveable member, the driving unit configured for driving the moveable member to move upward or downward along the mold cores relative to the stationary member.

2. The mold assembly as claimed in claim 1, wherein the central block defines a runner, the runner comprises a first channel, a second channel, and a third channel interconnecting the first channel and the second channel, the first channel communicates with two of the through holes, the second channel communicates with the other two of the through holes, and the female mold defines a sprue aligned with the third channel.

3. The mold assembly as claimed in claim 2, wherein the runner is I-shaped.

4. The mold assembly as claimed in claim 2, wherein each lubrication block comprises a lubrication surface facing the corresponding through hole, and two slots are defined in the lubrication surface and configured for receiving lubrication oil.

5. The mold assembly as claimed in claim 4, wherein each slot comprises an outer narrow slot portion having a first width and an inner wider slot portion having a second width greater than the first width, and the outer narrow slot portion is interconnected between the inner wider slot portion and the corresponding through hole.

6. The mold assembly as claimed in claim 4, wherein the driving unit comprises a plurality of hydraulic cylinders apart from the male cores, one end of each of the hydraulic cylinders is fixed to the stationary member, and the other end of each of the hydraulic cylinders is fixed to the moveable member.

7. The mold assembly as claimed in claim 6, wherein the female mold comprises a plurality of plates with dot structure thereon, and each plate is received in a corresponding recess and configured for forming dots on the light guide plate.

* * * * *